Oct. 6, 1953     W. S. PEARSON     2,654,292
BURR REMOVER
Filed Oct. 8, 1948                             2 Sheets-Sheet 1
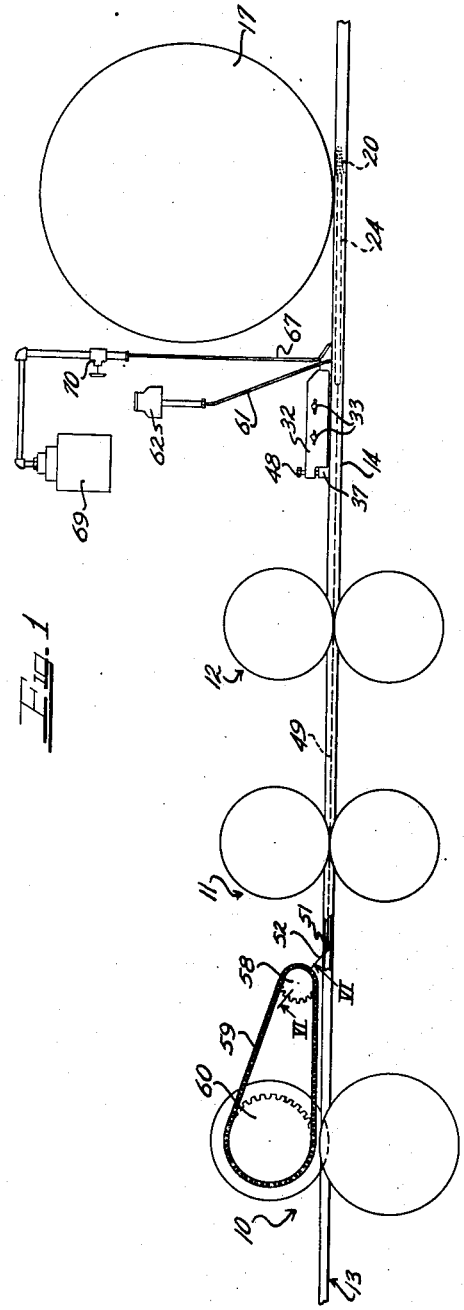
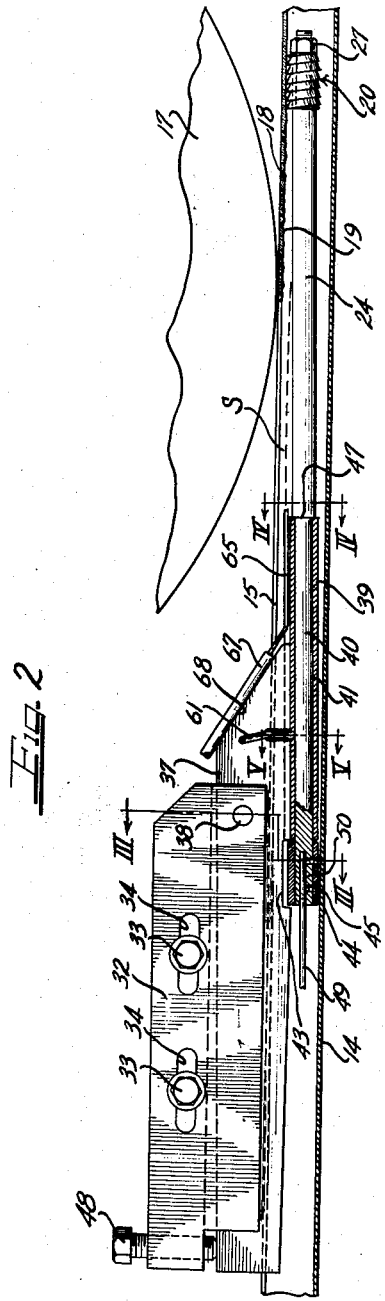
Inventor
WILLIAM S. PEARSON Oct. 6, 1953
W. S. PEARSON
2,654,292
BURR REMOVER
Filed Oct. 8, 1948
2 Sheets-Sheet 2
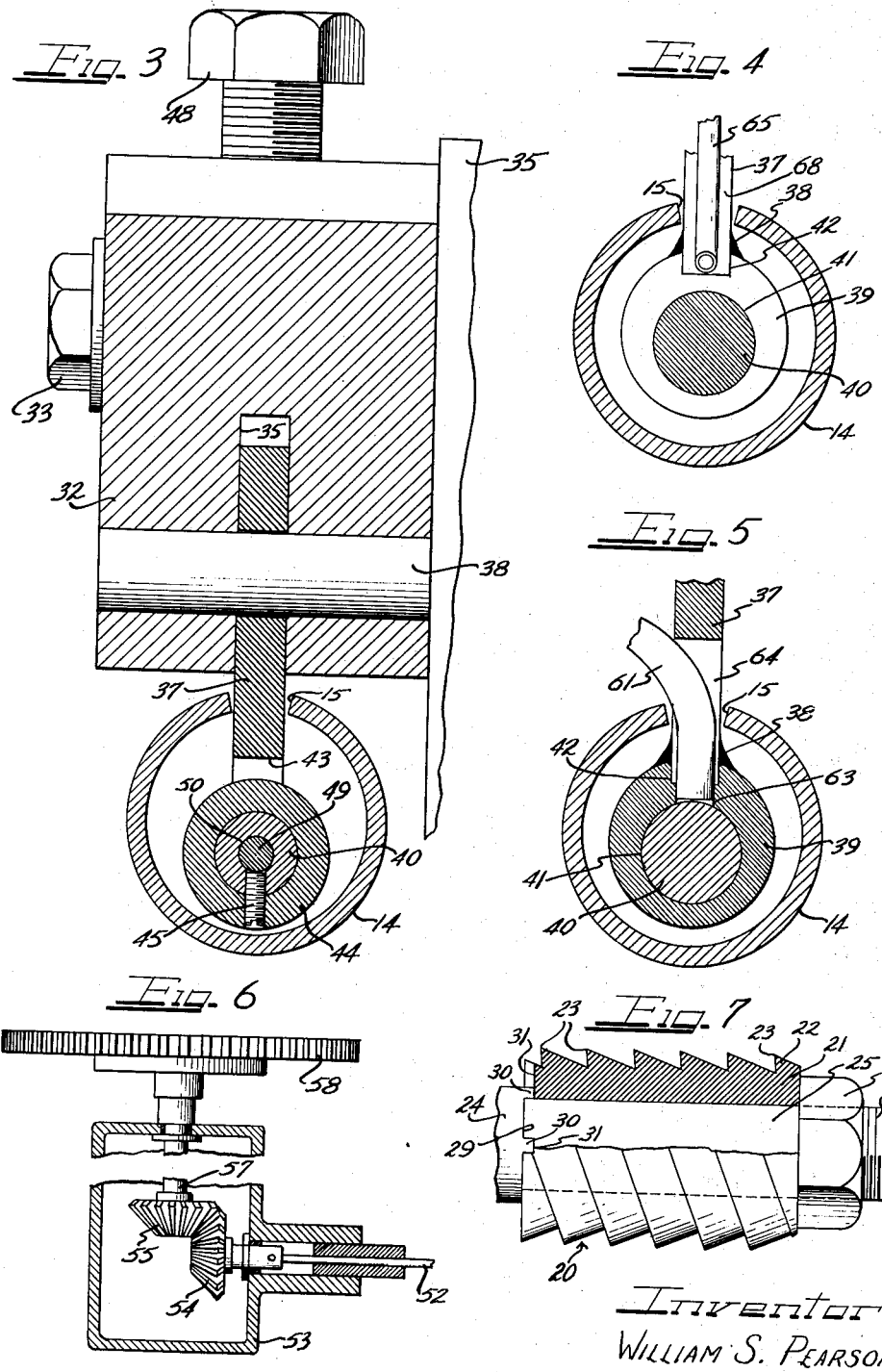
Inventor
WILLIAM S. PEARSON Patented Oct. 6, 1953

2,654,292

UNITED STATES PATENT OFFICE 2,654,292

BURR REMOVER

William S. Pearson, Baltimore, Md., assignor to Clifton Conduit Company, Inc., Baltimore, Md., a corporation of Maryland Application October 8, 1948, Serial No. 53,475

11 Claims. (Cl. 90—24)

The present invention relates to improvements in the removal of the burrs and roughnesses occurring in the welded joints interiorly of welded tubing, and more particularly relates to a novel method of and means for interiorly scarfing the freshly welded joints of welded tubing.

In the manufacture of welded tubing, strip metal such as steel is bent into tubular form by shaping the strip to a predetermined diameter and with the longitudinal edges in proximity. The slot between the edges is then welded closed by running the tubing under a welding head. At the interior of the welded tubing, the weld joint is generally irregular and rough and contains burrs and projections extending inwardly from the interior surface of the tubing. For obvious reasons it is highly desirable to have the weld joint smooth and as nearly as practicable conforming to the interior surface of the tubing.

Heretofore various expedients have been employed in an endeavor to smooth the interior of the weld joint, and among such expedients have been rolling and hammering devices. These have not produced as clean a joint as desirable, have been heavily power consuming, and subject to undue wear and thus relatively high replacement costs.

An important object of the present invention is to provide a novel method of and means for interior scarfing of welded tubing.

Another object of the invention is to provide a device for interiorly scarfing a welded tube joint relatively closely adjacent to the point of welding, and while the weld metal is still relatively soft.

A further object of the invention is to provide a novel interior weld joint scarfing device which is readily applicable to existing tube forming and welding machines.

Other objects, features and advantages of the present invention will be readily apparent from the following detailed description of a preferred embodiment thereof taken in conjunction with the accompanying drawings in which:

Figure 1 is a more or less schematic illustration of an interior scarfing device for welded tubing embodying the features of the invention and showing the same in the general operative relation thereof to a tube undergoing welding.

Figure 2 is an enlarged sectional elevational view showing the scarfing fixture of the device.

Figure 3 is a further enlarged vertical sectional view taken substantially on the line III—III of Fig. 2.

Figure 4 is an enlarged transverse sectional view taken substantially on the line IV—IV of Fig. 2.

Figure 5 is a vertical sectional view taken substantially on the line V—V of Fig. 2.

Figure 6 is an enlarged fragmental sectional detail view taken substantially on the line VI—VI of Fig. 1.

Figure 7 is an enlarged fragmentary sectional view of the scarfing tool head of the device.

The present invention is especially susceptible of use with a continuous tube forming machine in which a sheet metal strip is progressively shaped into tubular form and welded to join the relatively closely adjacent opposing longitudinal edges of the formed strip solidly together. Such a machine, as schematically shown in Fig. 1, may comprise a cooperating set of preliminary forming rolls 10 and succeeding progressive forming rolls 11 and 12 within which a sheet metal strip 13 is progressively fashioned so that when it emerges from the final set of forming rolls 12 it is in the form of a tube 14 having an upwardly opening slot 15 (Figs. 2 and 3) defined between the longitudinal edges of the strip brought into proximate, opposed relation by the forming operation. The slot 15 is closed in well known manner by welding and to this end the partially completed and fully shaped tube 14 is run in operative relation under a welding head 17. As a result the slot 15 is entirely closed and a homogeneous weld joint 18 (Fig. 2) is fused onto the edges defining the slot 15 and provides an integral closure bridge across the tube edges. At the inside of the weld joint 18, the molten metal sets up in a more or less rough condition as indicated at 19 and has many burrs and projections which are generally objectionable due to their interference with the concentricity of the inner surface of the tube and the obstruction created thereby at the interior of the tube.

According to the present invention the weld roughness 19 at the interior of the tube is removed as a continuous process in the continuous formation and welding of the tube 14 and preferably as close as practicable to the point of welding. This is accomplished through the medium of a scarfing tool 20 which is mounted in a predetermined position following the point at which the welding head 17 forms the weld 18 and acts as the tube is advanced thereby to scarf away the excess rough interior portion 19 of the hot weld and render the inner surface of the weld joint substantially conformable to the inner surface of the tube. By preference, the scarfing tool 20 is in more or less the form of a single thread rotary broaching head. For this purpose the tool 20 comprises a tubular body 21 of predetermined length and substantially smaller diameter than the interior of the tubing to be acted upon. The periphery of the body 21 is formed with a preferably single buttress thread 22 of which the axially facing surface is preferably at least slightly undercut so as to afford a relatively sharp cutting edge 23. If preferred, of course, the cutting edge thread 22 may be a multiple thread. An undercutting angle of approximately 3° in the axially facing surface of the cutting thread has been found quite satisfactory in practice. In longitudinal section it will be observed that the cutting thread 22 provides a plurality of cutting teeth which, as the tube is advanced longitudinally and with the axially facing surfaces of the thread or teeth directed rearwardly, the teeth become successively active in scarfing the excess material 19 of the weld joint to clean the inner surface of the joint.

Operative support for the scarfing tool 20 is provided by a shaft or cylindrical spindle 24 having a reduced diameter terminal portion 25 upon which the tool 20 is slidably received and then secured by means such as a nut 27 threaded onto a threaded extremity 28 of the reduced diameter portion 25 and bearing against the forward end of the tool while the rear end of the tool is driven by the nut 27 against a shoulder 29 at the base of the reduced diameter portion and preferably formed with keying lugs 30 which fit into keying grooves 31 in the rear end of the tool. Thus, the tool 20 is held for rotation with the shaft or spindle 24.

As best seen in Fig. 2, the shaft or spindle 24 is located within the tube 14 on an axis which is diagonal to the axis of the tube and sloping rearwardly so that the cylinder described by the periphery of the cutting tool 20 is also disposed in similar tilted or diagonal relation to the inner wall surface of the tube. Thereby, the several teeth of the tool provided by the spiral convolutions of the tooth thread or threads 22 become successively operable from the rear end of the tool to the front end in scarfing the rough interior portion 19 of the weld joint. This causes the rough, excess material 19 to be removed by progressive increments as the tube is drawn past the tool 20 with the scarfing teeth of the tool operatively located relative to the interior of the hot weld joint 18. In other words, each successive tooth of the scarfing tool 20 scrapes an increment of the excess weld material 19 free until the foremost tooth or convolution 22 scrapes the final increment which brings the surface of the weld into approximate conformity with the inner surface of the tube, and with the inner surface of the weld joint of a similar though probably somewhat smaller radius concavity than the curve of the tube interior.

Means for supporting the shaft or spindle 24 comprises a mounting block 32 which, by means of appropriate bolts 33 extending through horizontal bolt slots 34 therein is attached to an appropriate part of the machine frame as at 35 in Fig. 3. The horizontal slots 34 permit the block 32 to be adjusted in a horizontal direction. Within a longitudinal downwardly opening slot 35 in the block 32 is slidably mounted a downwardly projecting elongated supporting plate or fin 37 which adjacent to its forward end is pivotally connected as by means of a pivot pin 38. As will be observed in Figs. 2 and 3, the upper edge of the fin 37 preferably clears the upper wall of the slot 35 so that the fin is adapted to move pivotally in the slot for adjustment purposes. The thickness of the fin 37 is such that it can, at least in the lower portion thereof which depends below the mounting block 32, enter freely within the slot 15 in the formed tube 14. At its forward end the fin 37 extends a substantial distance beyond the forward end of the block 32 and has secured to the lower edge thereof as by means of welding 38 a journal tube 39 affording a sliding tubular bearing for a reduced diameter rear end portion 40 of the shaft or spindle 24. The length of the bearing or journal tube 39 and the rear bearing portion 40 of the shaft is preferably such as to afford adequate, strain-free cantilever bearing support for the shaft. By preference the journal tube is formed with an eccentric journal bore 41 and the thicker portion of the tube is disposed upwardly and formed with a slot 42 within which the edge of the fin 37 is received whereby to afford a strong, stable connection therewith. By preference the forward end of the journal tube 39 projects forwardly a substantial distance beyond the end of the forwardly projecting supporting portion of the fin 37, while the rear end of the journal tube registers with the forward end of a notch 43 in the lower edge of the fin 37 and adapted to accommodate a retaining sleeve 44 secured as by means of set screws 45 to a rearwardly projecting terminal portion of the reduced diameter bearing section 40 of the shaft and cooperating with the rear end of the bearing tube 39 to hold the shaft 24 against forward axial displacement, while a shoulder 47 at the forward end of the reduced diameter portion 40 on the shaft 24 cooperates with the forward end of the bearing tube 39 to restrain the shaft against rearward axial displacement.

The location of the shaft supporting assembly is sufficiently rearwardly of the point of welding to clear the welding head 17, but is located sufficiently close thereto so that the shaft 24 will not need to be any longer than necessary to reach to the preferred point forwardly of the welding point to be most effective for the scarfing action of the tool 20. Furthermore, the shaft supporting assembly is located with respect to the path of movement of the formed tube 14 so that with the fin 37 inserted into the tube slot 15, the retaining collar or sleeve 44 at the rear end of the shaft will come relatively close to the bottom of the interior wall of the tube but will clear the same sufficiently so that there will be no rubbing interengagement with the tube as the latter moves thereby, and yet the angle of the shaft 24 will be adequate to afford the desired and most efficient diagonal angularity for the tool 20.

In order to permit adjustment of the angularity of the shaft 24 and thus of the tool 20 with facility in order to attain optimum scarfing action of the tool 20 in operation, the rear end portion of the supporting block 32 is provided with an adjusting screw 48 which acts upon the upper edge of the rear portion of the fin 37 to effect pivotal adjustment thereof in a vertical plane about the axis of the connecting pin 38. Thus, by turning the screw 48 down, the rear end of the pin 37 is moved downwardly while the forward end is swung upwardly about its pivot 38 and the shaft 24 and the tool 20 correspondingly shifted. By turning the adjustment screw 48 out, the rear end of the fin 37 will move up while the forward end will move down and thus depress the tool 20. While the adjusting screw 48 is effected for positively moving the rear end of the fin 37 downwardly, upward movement of the rear end of the fin is a result of the overbalance of weight carried by the forward end thereof which normally tends to swing the forward end of the fin downwardly in opposition to the adjustment screw 48. Hence, it will be seen that accurate adjustment can be readily effected simply and effectively by manipulation of the adjustment screw 48 insofar as the angle of the shaft 24 and the tool 20 are concerned, while horizontal adjustment forwardly or rearwardly can be readily effected by loosening the attachment bolts 33 and shifting the supporting block 32 in order to position the scarfing tool 20 at the proper point.

In order to avoid uneven wear or channeling of the cutting thread or teeth of the scarfing tool 20, it is desirable to rotate the tool. To this end means are provided for rotating the shaft 24, herein comprising a long relatively thin shaft 49 adequate for the purpose which may be connected to the rear end portion of the shaft 24 as by reception thereof within an axial socket 50 within which the terminal portion of the shaft 49 is secured as by means of the set screws 45. From this connection, the shaft 49 extends rearwardly past the sets of forming rolls 11 and 12 to a universal connection 51 (Fig. 1) with an angular drive shaft 52 that extends out through the slot in the partially formed tube 14 and is drivingly connected with the set of forming rolls 10. To this end, as best seen in Figs. 1 and 6, the shaft 52 is appropriately bearinged in a wall of a housing 53 within which a beveled gear 54 on the end of the shaft 52 meshes with a beveled gear 55 on a shaft 57 having at its opposite end a sprocket 58 about which is trained a drive chain 59 motivated by a larger sprocket 60 connected with the upper one of the forming rolls 10, or at least mounted on the same shaft therewith and thus rotatable with such roll. By preference the gear ratio is such that the tool shaft or spindle 24 is rotated approximately one revolution for about every foot of movement of the tube 14. This has been found to work out quite advantageously in practice. It has also been found desirable to have the shaft 24 rotate in the direction which causes the spiral cutting edge 23 to substantially follow the direction of movement of the tube. This tends to compensate for the lateral pressure which is imposed upon the tool 20 while cutting due to the pitch of the cutting edge. By reason of the rotation of the tool as described, this lateral pressure is relieved.

In addition, by having the tool 20 rotate in operation, chips are prevented from piling up against the axially facing face of the cutting thread or tooth 22 and clogging the cutting edge 23.

For lubricating the bearing surfaces of the bearing portion 40 of the tool shaft and the internal bearing surface 41 of the journal tube, means such as a gravity feed oiling system including an oil delivery tube 61 and an elevated oil receptacle 62 (Figs. 1, 2 and 5) may be provided. The delivery end of the tube 61 is fixed in an upwardly opening lubricant port 63 in the journal tube 39 and above which a clearance slot 64 in the adjacent portion of the supporting fin 37 accommodates the end portion of the oil delivery tube. By having the oil delivery tube disposed at an appropriate intermediate point in the length of the bearing surfaces, there is minimum leakage of lubricant beyond the ends of the journal tube.

Since the tool shaft or spindle 24 is located directly below the welding point intermediate the supporting assembly and the scarfing tool 20, the shaft will, of course, be subject to heat radiated from the welding and also to spatter of metal. In order to cool the shaft and to prevent the weld spatter from sticking to the shaft, a coolant is provided for the shaft. If preferred, the entire machine could be so adjusted or raised that the tube 14 would travel at an upward angle so that the shaft forwardly of the bearing tube 39 and at least up to the portion thereof under the welding head 17 would be immersed or substantially immersed in the coolant contained in the tube 14. However, in a practical installation, a stream of coolant such as water is directed to the portion of the shaft below the point of welding as indicated at S in Fig. 2 from a small nozzle or tube 65 preferably located in the slot 42 in the top of the bearing tube 39 (Figs. 2 and 4) and connected to a supply tube 67 of larger diameter secured as by brazing or welding to the forward edge of the fin 37 which for clearance purposes may be formed obliquely as indicated at 68. The supply tube 67 is connected to an appropriate source of coolant or water supply 69 (Fig. 1) and may have a valve 70 in control thereof. The pressure of the coolant fluid or water is preferably regulated so that the coolant stream S will impinge at the proper point on the shaft 24, and will be in adequate volume for the purpose at hand but will not flow in over abundance. Excess water and chips are carried on by the finished tube and are disposed of in the subsequent washing and pickling process.

In explanation of the term "scarfing" used herein, it should be remembered that although the tool 20 which does the actual metal cutting in removing the excess and rough weld material 19 at the interior of the tube, is in the nature of a broach, it actually performs a scarfing function. That is, rather than the action of the tool against or upon the work being effectuated by rotation or movement of the tool relative to the work, the work in this instance moves relative to the tool which would function even though it were held completely stationary. The cutting edge or edges of the tool scrape or scarf the excess welding material 19 from the welded joint by presenting a cutting edge over and against which the interior of the weld joint is drawn or pushed so that the excess material is shaved or chipped away. The slow rotation of the tool, as explained hereinabove, is primarily for the purpose of preventing clogging and channeling of the cutting tool and greatly prolongs its life by distributing wear over the entire circumference of the tool.

In practice it has been found that the scarfing tool 20 operates quite efficiently when placed four to six inches past the point of welding. At this point, the weld metal has fused but is still hot and soft enough for efficient scarfing of the excess material 19. The high efficiency of the present method and apparatus is well demonstrated by the fact that in actual practice up to 500,000 feet of tubing has been successfully scarfed in a working installation without requiring any attention to the apparatus.

Although the term "welding" is used herein, it should be understood that the term is used, to the extent practicable, in a generic sense to include not only welding of steel but also brazing, soldering or the like where those are the preferred expedients for effecting a joint.

It will, of course, be understood that various details may be varied through a wide range without departing from the principles of this invention and it is, therefore, not the purpose to limit the patent granted hereon otherwise than necessitated by the scope of the appended claims.

I claim as my invention:

1. In combination in apparatus for scarfing the interior of a freshly welded tube joint, a supporting structure, a spindle projecting from the supporting structure, and adapted to support a scarfing tool at its extremity remote from the supporting structure, and means for turning the spindle, said turning means including a part adapted to be disposed interiorly of the tubing and a part exteriorly of the tubing and arranged to project into association with the interiorly disposed part through the open slot in the tubing prior to welding thereof.

2. In combination in apparatus for interiorly scarfing a freshly welded joint in tubing, a supporting block, a fin carried by the block and arranged to extend into the slot of formed tubing behind the point at which the slot is closed by welding, an elongated member supported by said fin and arranged to extend forwardly longitudinally of the tubing to a point beyond the point of welding, and a scarfing tool of substantially smaller diameter than the internal diameter of the tubing supported by said elongated member for scarfing the joint at said point beyond the point of welding.

3. In combination in apparatus for scarfing the interior of a freshly welded joint on tubing at a point spaced a relatively short distance past the point of welding of a longitudinal slot in the tubing, supporting means including a relatively narrow member of a thinness to extend through the slot in the tubing to the interior of the tubing, a tubular bearing supported by said member within and adjacent to the bottom of the partially formed tubing and with its axis extending generally longitudinally of the tubing but slightly angularly upwardly, a spindle supported rotatably and coaxially by said bearing and extending angularly forwardly and upwardly past the point of welding to said point past the point of welding, a rotary scarfing tool of substantially smaller diameter than the internal diameter of the tubing carried by the spindle at said point beyond the point of welding for scarfing the joint, and means for rotating the spindle.

4. In combination in apparatus for scarfing the interior of a freshly welded joint on tubing at a point spaced a relatively short distance past the point of welding of a longitudinal slot in the tubing, supporting means including a relatively narrow member of a thinness to extend through the slot in the tubing to the interior of the tubing, a tubular bearing supported by said member within the tubing and with its axis extending generally longitudinally of the tubing, a spindle supported rotatably by said bearing and extending past the point of welding to said point past the point of welding, a rotary scarfing tool carried by the spindle at said point beyond the point of welding for scarfing the joint, means for rotating the spindle, and means arranged to extend through the slot in the tubing for supplying lubricant to the interior of said tubular bearing.

5. In combination in apparatus for scarfing the interior of a freshly welded joint in tubing while the joint is still hot, supporting means including a member arranged to project through the slot in the tubing before the welding point, an elongated element supported by the member and projecting forwardly generally longitudinally of the tubing under and past the welding point and to a scarfing point past the welding point, and means associated with the supporting means and including a duct entering through the slot to the interior of the tubing adjacent to said member and disposed to deliver a stream of coolant externally to said element adjacent to the welding point.

6. In combination in apparatus for interiorly scarfing a freshly welded joint on tubing, a scarfing tool having a longitudinally spaced series of cutting edge sections, and means for supporting the scarfing tool interiorly of the tubing with the cutting edges of the sections disposed on an oblique line running from the rearmost section to the leading section and converging with the line of the weld joint so that said cutting edges will be successively operable to remove progressively deeper portions of the excess material from the interior of the welded joint, starting with the cutting edge of the rearmost section and finishing with the cutting edge of the leading section.

7. In combination in apparatus for interiorly scarfing a welded joint on tubing, an elongated member, a scarfing tool carried by said member and having a plurality of successively operable cutting edge sections with the cutting edges disposed in a plane generally parallel to the axis of said member, and means for supporting the elongated member interiorly of the tubing on which a welded joint is to be scarfed, the elongated member being disposed at a diagonal angle relative to the axis of the tube and converging toward the welded joint whereby to dispose the successive cutting edges to become successively operable to remove successively deeper layers in scarfing the welded joint.

8. In a machine for making tubing from sheet metal strip and including a series of forming rolls for shaping the strip into a tube having the longitudinal edges of the strip in the formed tube defining a longitudinal slot therebetween, and a welding head disposed beyond the final forming rolls for welding the slot closed, a supporting structure disposed in stationary position between the final forming rolls and the welding head and having a portion thereof entering the slot in the formed tube, said portion supporting an elongated spindle extending forwardly beyond the welding point, a rotary scarfing tool of substantially smaller diameter than the inner diameter of the tube carried by said spindle at a predetermined operating position for scarfing the interior of the freshly welded joint beyond said welding point as the tube moves past the scarfing tool, and means driven in coordination with said forming rolls for rotating said elongated spindle slowly and thus rotating the tool slowly for gradually presenting progressive portions of the periphery of the tool to the joint being scarfed and thereby avoiding channeling of the tool.

9. In a machine for making tubing continuously by progressive steps from sheet metal strip and including a series of forming rolls for shaping the strip into a tube having the longitudinal edges of the strip in the formed tube defining a longitudinal slot therebetween, and a welding head disposed beyond the final forming rolls for welding the slot closed, a supporting structure disposed between the final forming rolls and the welding head and having a portion thereof entering the slot in the formed tube, said portion supporting an elongated spindle extending forwardly beyond the welding point, a rotary scarfing tool carried by said spindle for scarfing the interior of the freshly welded joint beyond said welding point, and means driven in coordination with said forming rolls for rotating said elongated spindle, said spindle rotating means including a chain and gear drive mechanism drivingly associated with one of the forming rolls.

10. Apparatus for internally scarfing a freshly welded joint of welded seam tubing while the joint is still in a heated condition a short distance beyond the welding point as the tubing moves continuously onward from the welding point, comprising supporting means extending through the slot in the tubing behind the point of welding a scarfing device including an elongated rotary spindle supported by said supporting means and having a rotary scarfing tool at its operating end, with the spindle extending past the point of welding and thus subject to receiving thereon sputtered material from the welding operation, means for rotating the spindle and scarfing tool slowly as the joint is welded and thereby scarfingly scraping the joint clean, and nozzle means associated with said supporting means and located behind the point of welding for continuously impinging coolant upon the external surface of the spindle directly opposite the welding point to cool the spindle and prevent adherence of sputtered metal thereon.

11. In combination in apparatus for interiorly scarfing a freshly welded tube joint, generally vertically extending supporting means having a lower portion of a thinness to be received within the open joint in tubing to be welded, said portion having on the lower part thereof an elongated element of substantially smaller diameter than the internal diameter of the tubing and of a length to extend forwardly under and past the welding point for positioning a scarfing tool at a scarfing point forwardly of the welding point, and means at the upper portion of said supporting means for adjusting the same and thereby said elongated member for adjusting the position of the scarfing tool.

WILLIAM S. PEARSON.

References Cited in the file of this patent

UNITED STATES PATENTS

| Number | Name | Date |
|---|---|---|
| Re. 20,439 | Rippel | July 6, 1937 |
| 1,678,963 | Sussman | July 21, 1928 |
| 1,706,393 | Fay | Mar. 26, 1929 |
| 1,907,543 | Hoffer | May 9, 1933 |
| 2,025,422 | Park | Dec. 24, 1935 |
| 2,053,829 | Hisi | Sept. 8, 1936 |
| 2,054,311 | Adams | Sept. 15, 1936 |
| 2,202,898 | Caputo | June 4, 1940 |
| 2,243,197 | De Fiore | May 27, 1941 |
| 2,250,349 | Berginst | July 22, 1941 |
| 2,439,422 | Fear | Apr. 13, 1948 |

FOREIGN PATENTS

| Number | Country | Date |
|---|---|---|
| 306,088 | Germany | June 17, 1918 |
| 488,844 | Germany | Jan. 13, 1930 |